United States Patent Office 3,376,028
Patented Apr. 2, 1968

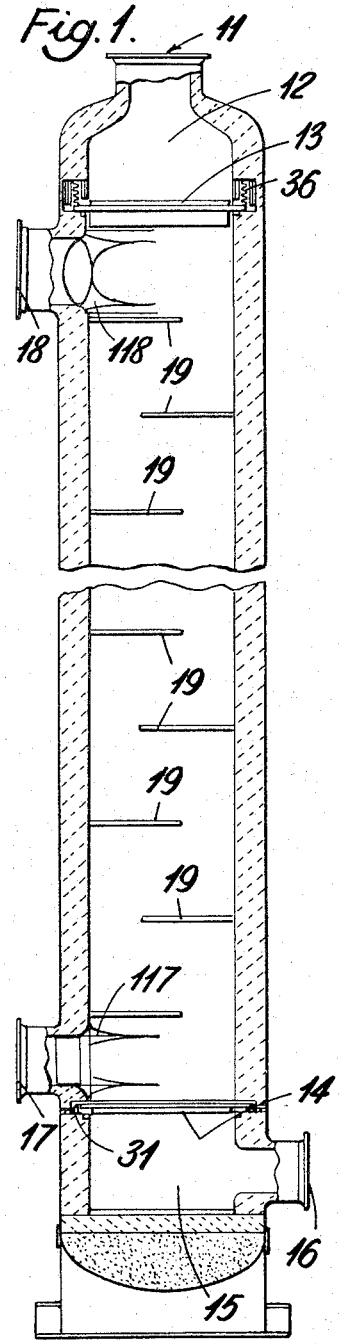
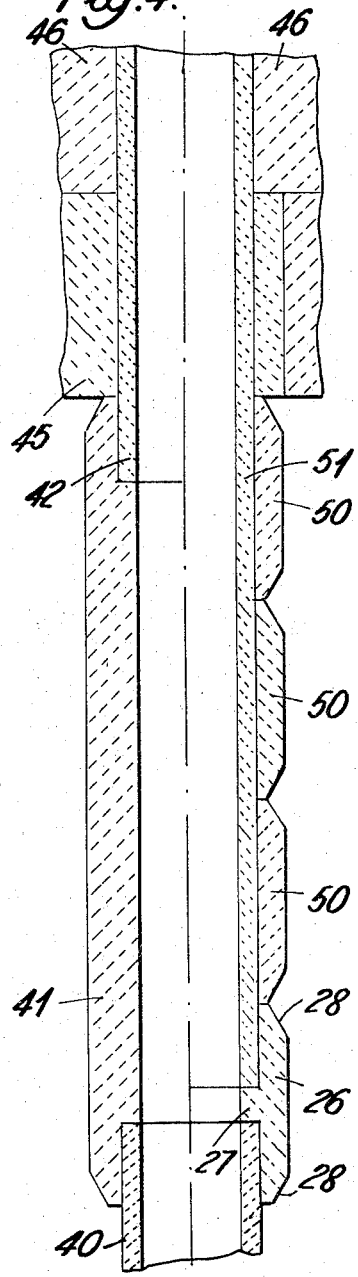

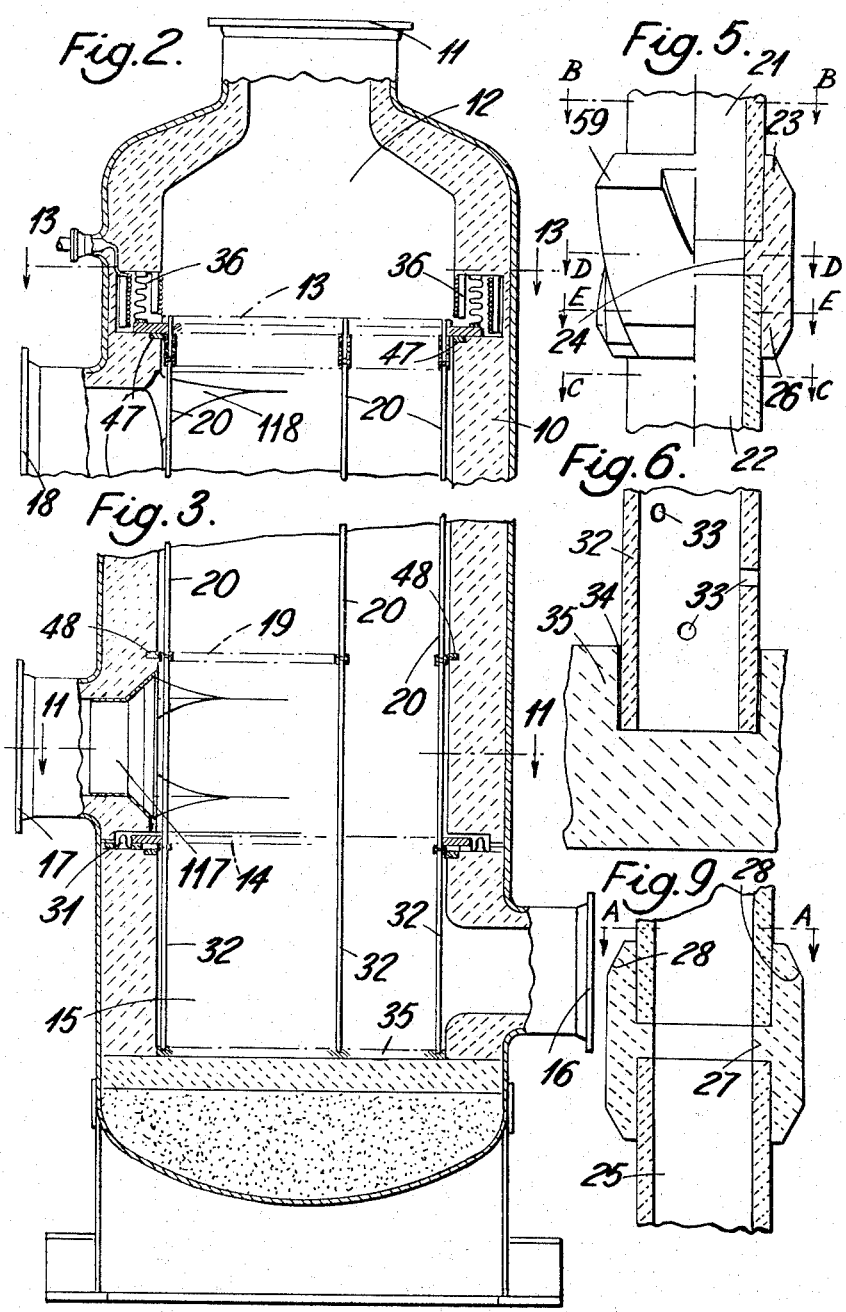

3,376,028
TUBULAR RECUPERATIVE HEAT EXCHANGERS WITH SOCKET MEMBERS JOINING TUBE SECTIONS END TO END
Dennis Brigham Leason, Dorking, and Stanley Harry Gwalter, Wallington, England, assignors to Central Electricity Generating Board, London, England, a British body corporate
Filed May 23, 1966, Ser. No. 552,129
2 Claims. (Cl. 263—20)

ABSTRACT OF THE DISCLOSURE

A tubular recuperative heat exchanger has tubes, more particularly ceramic tubes, formed in a number of lengths, joined end to end by socket members. The socket members abut one another in the transverse direction to give lateral support for the tubes. The socket members may form a baffle for the fluid passing over the outside of the tube or they may have helical castellations so as to permit free passage of the fluid outside the tube whilst still supporting the tubes against swaying.

---

This invention relates to a tubular recuperative heat exchanger of the kind having a number of tubes extending through a vessel, one of the fluids being passed through the tubes the other being passed through the vessel. Typically the tubes would be arranged vertically and a hot fluid for example, a hot gas passed through the tubes from the top to he bottom thereof whilst another fluid, for example another gas, might be fed through the vessel from the bottom to the top. The present invention is directed particularly to a form of construction which enables ceramic tubes to be used thereby making it possible for the heat exchanger to operate at very much higher temperatures than has heretofore been possible using metallic tubes.

According to this invention, in a tubular recuperative heat exchanger having a number of tubes extending with their axes parallel through a vessel, the tubes are formed in two or more sections which are joined by sockets, each socket comprising a tubular member into which the aligned ends of two tubes fit, and each socket member having an external surface such that a group of the socket members disposed with parallel axes fit together so that each socket is in contact with its neighbouring sockets. The various tubes thereby give support to one another to prevent swaying of the tubes. The heat exchanger would normally be constructed with the tubes vertical so that the joints between the tubes are closed by the weight of the tubes above.

It is possible to fit tubes together using these socket members and to make the socket members form a baffle extending partly or wholly across the vessel. The construction however readily permits of the tubes and the sockets being formed of a refractory material as for example a ceramic refractory material. For a high temperature heat exchanger, the tubes and sockets might be formed of a refractory oxide such as alumina, magnesia, zircon or of combinations of these materials or alumina silicate combinations giving the required properties for the temperature range at which the heat exchanger is to operate.

A wall or baffle formed in this manner by adjacent socket members may, to prevent leakage, be overlaid with tiles which may be made of the same or similar material to the socket members. These tiles need only have simple holes to allow the tubes to pass through. The joints between the socket members or between the socket members and tiles may be cemented in regions of the heat exchanger where pressures cannot be balanced. If a cement is used it should be compatible with the material employed for the tubes and sockets and conveniently a ceramic noncorrosive and non-slagging cement may be employed. This may be glassy in ntaure so as to be viscous at operating temperatures thereby permitting slight movement without leakage to joint.

Preferably the heat exchanger is designed so that, in the region of maximum possible movement, the pressures are balanced between the heating fluid and heated fluid in order to minimise leakage. In this region, moreover, the socket members which abut one another to form a wall or baffle may be made deeper so as to give a longer path for any possible leakage between these socket members.

In one arrangement, the heat exchanger is operated with the tubes vertical and in this case, the heat exchanger may comprise an outer vessel of generally upright form with a number of parallel upright tubes extending through it. In a large heat exchanger, typically of the order of a thousand tubes may be employed. Sealing walls are formed across the vessel near the top and bottom thereof to provide inlet and outlet chambers for the fluid which is to be passed through the tubes. At the bottom end, the bottom sealing plate may be formed with socket members as described above and the tubes may each be supported by continuing the tubes downwardly through the bottom sealing plate into a locating plate in the base of the vessel but with the tube portions below the bottom sealing plate having holes in the walls of the tubes so that fluid can pass from the tubes into the vessel or vice versa below the bottom sealing plate. In the vessel between the sealing plates, a number of baffles may be provided each extending partially across the vessel. Conventional design methods may be used to determine the optimum size and length of the tubes, the number of baffles and the velocity of fluid both inside and across the tubes. At the top end, the top sealing plate may be formed of socket members as described above with a plurality of tiles penetrated with holes through which the tubes pass overlying these sockets. Conveniently these tiles are of diamond shape. Around the periphery of the vessel, specially shaped tiles may be used which conform to the shape of the vessel. These peripheral tiles may be secured to a bellows structure in the vessel wall so as to permit of movement of the sealing plate.

It may be required in the heat exchanger to join tubes together end to end without forming a baffle. This may be done by using sockets of the general form described above but of smaller external section so as to leave gaps between adjacent sockets. Preferably, however, helical castellations are provided on the external surface of such sockets so that each socket will touch each of its neighbouring sockets leaving however passages between the castellations for the fluid flow. If the tubes are arranged so that each tube is surrounded symmetrically by six other tubes, the socket members may conveniently be of generally circular form externally with those castellations, each castellation twisting helically around the surface for about 60°.

The following is a description of one embodiment of the invention reference being made to the accompanying drawings in which:

FIGURE 1 is a vertical section through a heat exchanger;

FIGURE 2 is an enlarged detail section of the top of the heat exchanger of FIGURE 1;

FIGURE 3 is an enlarged detail section of the bottom of the heat exchanger of FIGURE 1;

FIGURE 4 is a sectional diagram illustrating two methods for supporting the top sealing plate in the arrangement of FIGURE 1;

FIGURE 5 is a sectional elevation through a socket adjoining two tubes without forming a baffle;

FIGURE 6 is a sectional elevation showing a support tube in a locating plate;

FIGURE 9 is a sectional elevation through a socket for forming a baffle;

Figure 7:
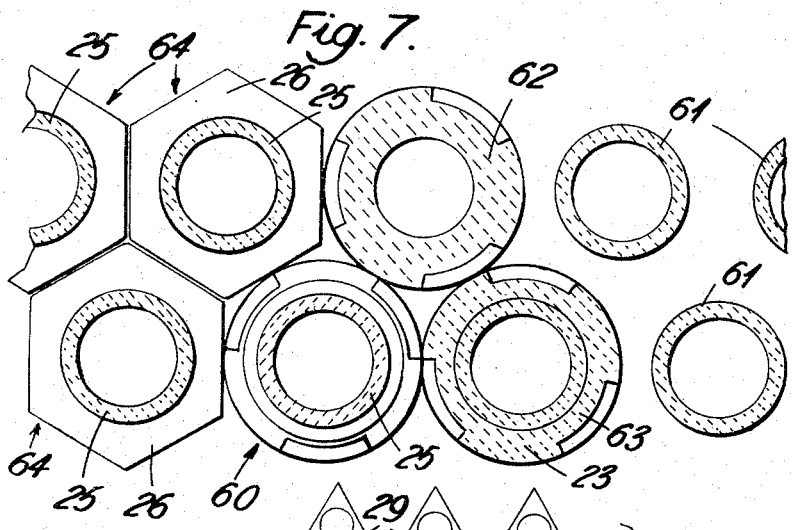
FIGURE 7 illustrates a number of sockets in plan view.

Referring to FIGURE 1, the heat exchanger illustrated comprises an upright vessel 10 having an inlet 11 for hot gases which pass into a chamber 12 in the top of the vessel 10. This chamber is sealed off by a top sealing plate 13. A number of tubes (not shown in FIGURE 1) pass through this top sealing plate and extend down through the length of the vessel and through a bottom sealing plate 14 into a bottom chamber 15 leading to a gas outlet 16. This particular heat exchanger is used for heating air making use of the heat from the hot gases fed downwardly through the tubes. The air inlet is shown at 17 with a diffuser 117 and the air outlet at 18 with a diffuser 118, the air passing upwardly through the vessel between the two sealing plates around the outside of the aforementioned tubes. A number of baffles 19 extend partially across this part of the vessel in horizontal planes. The vessel 10 is constructed of steel in the usual manner and is provided with an inner lining of refractory material in order to minimise heat loss and prevent the steel from reaching a high temperature.

The aforementioned tubes are ceramic tubes formed of a refractory oxide as previously explained and they extend vertically through the vessel 10. Typically a thousand such tubes might be employed. Three such tubes are shown at 20 in FIGURES 2 and 3. The tubes are made of suitable lengths which are joined together where required by a socket of the type shown in FIGURE 5. Referring to that figure, there are shown the adjacent ends of two tubes 21, 22 which fit into a socket 23 having an inwardly extending flange 24 forming shoulders on which the ends of the tubes 21, 22 abut. The tubes 21, 22 are of circular section and the flange 24 has an internal section similar to the section of the tubes so as to provide a continuous passage of uniform diameter through the tube and socket assembly. Externally the socket in FIGURE 5 is of circular section castellated with a helical form. In this embodiment there are three helical castellations 59 evenly spaced around the socket and each twisting helically through about 60°. The form of these castellations is more clearly apparent from FIGURE 7 which includes, at 60, a view on B, B of FIGURE 5 and at 61, 62 and 63, sections on the lines C, C, D, D, and E. E respectively. It will be seen that the external helical castellations leave passages between the sockets but each socket will, at some point, be in contact with each of its neighbouring sockets so preventing the tubes swaying.

Figure 10:
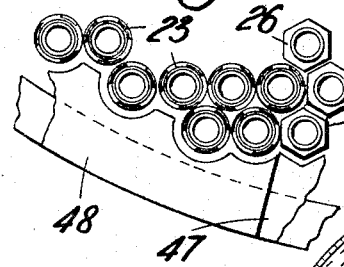
FIGURE 10 is part of a plan view at baffle level.

To form a baffle, the tubes at the approximate level are joined by sockets which externally are of hexagonal form, as shown in FIGURE 7 at 64. This figure shows three test tubes 25 located respectively within sockets 26 which are nested together as illustrated, the tubes and sockets being seen as sections on A, A of FIGURE 9. One of these sockets 26 is shown in vertical section in FIGURE 9 and in the right hand half of FIGURE 4 where it will be seen that the socket has an inwardly directed flange 27 similar to the flange 24 FIGURE 5 to provide a smooth passage through the tubes internally. The external hexagonal portion has tapered ends 28 to give a smooth air flow over the external surface. FIGURE 10 is part of a plan at baffle level showing some sockets 26 forming a baffle and some sockets 23. Also at each baffle level containing sockets 26 and 23 there are provided edge tiles 47 and 48 respectively, which tiles are embedded in the refractory lining of the vessel 10. As seen in FIGURE 1, the baffles 19 at different levels are staggered.

Figure 8:
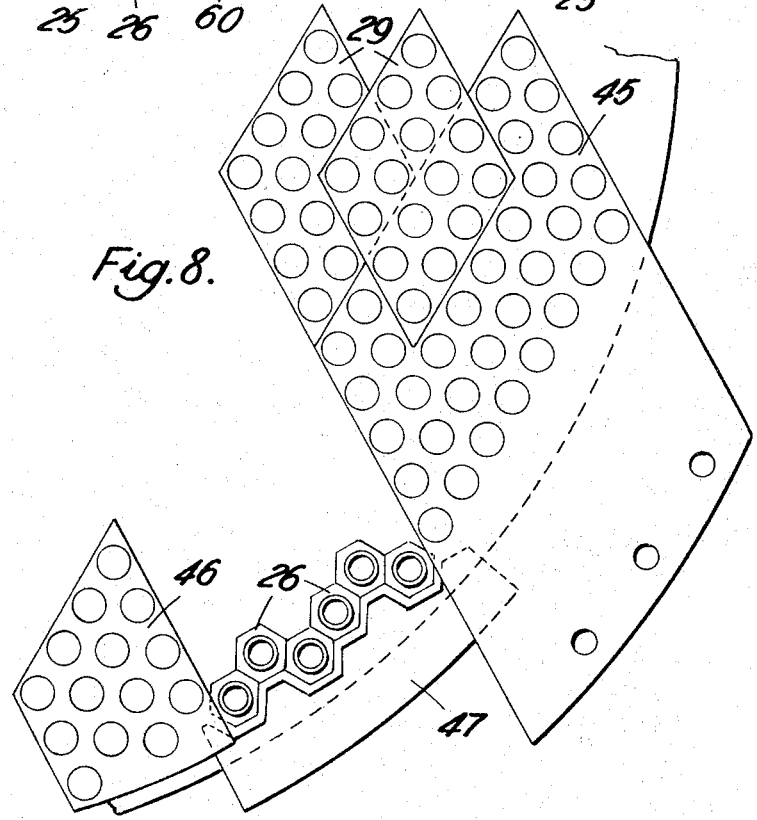
FIGURE 8 is a composite drawing illustrating a number of types of sealing plates and edge tiles.
Figure 11:
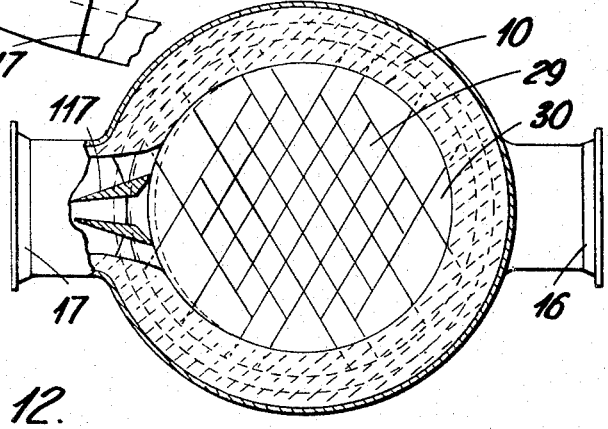
FIGURE 11 is a section on 11, 11 of FIGURE 3.

The bottom sealing plate is formed by sockets similar to those shown in FIGURE 7. To prevent leakage, however, these sockets are overlaid with refractory tiles having holes through which the tubes can pass. These tiles conveniently are of diamond form and typical such tiles are illustrated at 29 in FIGURE 8. FIGURE 11 is a view on the line 11, 11 of FIGURE 3, showing the bottom sealing plate in plan, with a single layer of the diamond shaped tiles 29 in the centre and specially shaped tiles 30 around the periphery overlaid over the sockets. The bottom plate is attached to the outer shell 10 by a bellows 31 permitting the movements arising from the small thermal expansion. Below the bottom sealing plate, the tubes must open into chamber 15 of the vessel 10 and, as is shown in FIGURE 6, special support tubes 32 in this region have a number of holes 33 spaced along the length of the tube. The bottom end of each bottom tube 32 sits in a suitably shaped recess 34 in a locating base plate 35 above the domed bottom end of the vessel 10.

Figure 12:
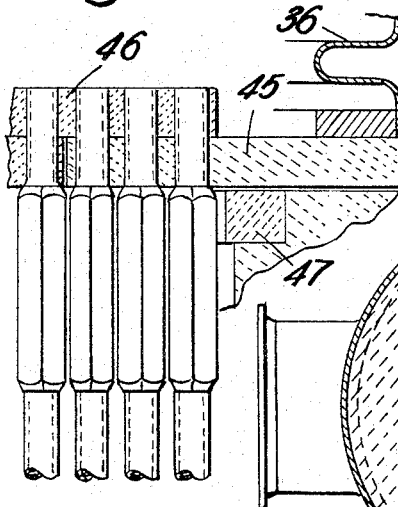
FIGURE 12 is a detail view in a section along the line 12, 12 of FIGURE 14.
Figure 13:
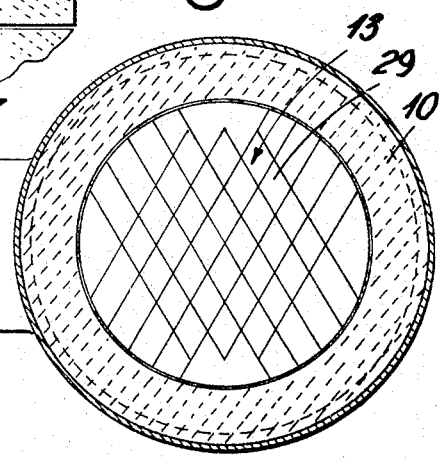
FIGURE 13 is a plan view along the line 13, 13 of FIGURE 2.
Figure 14:
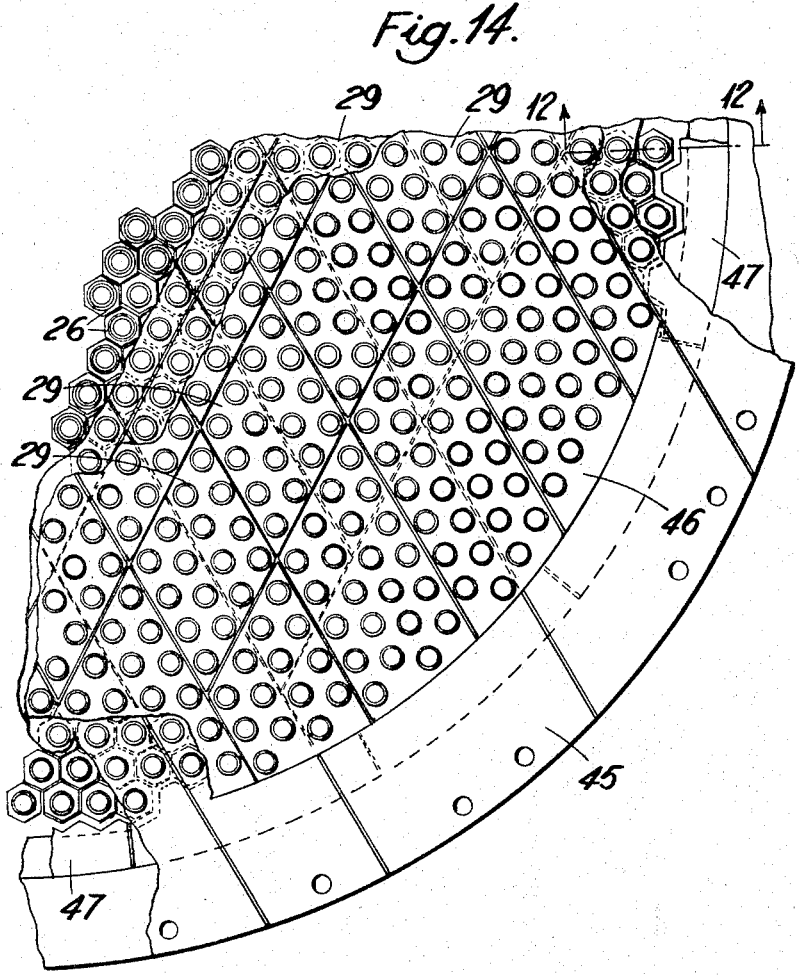
FIGURE 14 is a view similar to FIGURE 8 showing further details of an upper support plate.

For the top plate, it is necessary to allow for much greater relative movement of the tubes and vessel due to differential expansion than at the bottom plate. In the construction illustrated, a bellows 36 (FIGURES 1 and 2) is provided for sealing the top plate 13 to the wall of the vessel 10 yet permitting of vertical movement of this top plate. FIGURE 4 illustrates, in its left and right hand sides respectively, two alternative methods for supporting the top plate 13. At the left hand side there is shown one of the tubes 40, an elongated hexagonal socket member 41 and a further tube 42 fitting into the top end of the socket member 41 which further tube is open to the upper chamber 11. The socket members 41 fit together to form a relatively deep wall across the top of the vessel supported on the tubes 40. This wall is overlaid with a number of tiles such as the tiles 29 of FIGURES 8 and 14. For the top plate, two layers of diamond shaped tiles are used, the joints between the tiles being staggered so as to make a labyrinth and thus restrict leakage of the gas into the air. The lower layer of tiles constitutes the bellows support plate whilst the upper layer forms a sealing plate. Around the periphery, the lower layer of tiles includes special tiles such as the tile 45 of FIGURE 8 which overlie the hexagonal socket members and which extend radially outwardly to be secured to the bottom end of the bellows structure 36. Above the bellows support plate formed by these tiles 45, which are located above edge tiles 47 (FIGURE 8) around the periphery of the vessel, is a top sealing plate 46 abutting the diamond plates 29. FIGURE 14 is a typical plan of the upper tube plate showing further detail. FIGURE 12 is a detailed vertical section, to a larger scale than FIGURE 2, illustrating part of the bellows support in a section on the line 12, 12 of FIGURE 14. FIGURE 13 is a view on the section 13, 13 of FIGURE 2 showing the layout of the bellows support ring.

The alternative construction for supporting the top plate, shown in the right hand side of FIGURE 4, makes use of a standard hexagonal socket 26 above the lower tube 40. Above this socket around the tube 41 and extending to the top chamber 11 are a number of sleeve members 50 externally of hexagonal form corresponding to the shape of the socket member 41. These sleeve members support the bellows support plate 45 or tiles 29 which in turn support the top sealing plate formed by the tiles 29 and 46.

The pressures are balanced between the heating and heated fluids at the region of maximum movement, that is to say, the top of the heat exchanger in the arrangement illustrated in FIGURE 1 in order to minimise leakage. Where pressures cannot be balanced, the joints are cemented using a glassy ceramic non-corrosive and non-slagging cement which is viscous at operating temperatures to permit slight movement without leakage at the joint.

We claim:

1. A tubular recuperative heat exchanger having a number of tubes extending, with their axes parallel, through a vessel, wherein each tube is formed in at least two sections which are joined by sockets, each socket comprising a tubular member into which the aligned ends of two tube sections fit, and each socket member having an external surface such that a group of socket members disposed with parallel axes fit together so that each is in contact with its neighbouring sockets, at least some of the socket members having helical castellations on their external surfaces thereby leaving fluid passages between adjacent socket members.

2. A tubular recuperative heat exchanger as claimed in claim 1 wherein the tubes are vertical and of circular section internally and externally and wherein each socket member internally has a short length tubular portion of the same internal cross-section as said tube sections with portions at each end thereof of the same cross-section as the external cross-section of the tube sections to be joined.

References Cited

UNITED STATES PATENTS

| | | | |
|---|---|---|---|
| 1,619,747 | 3/1927 | Morton | 263—20 |
| 1,771,160 | 7/1930 | Chapman | 263—20 |
| 2,139,367 | 12/1938 | Kearney | 165—172 X |
| 3,309,072 | 3/1967 | Cummings | 263—20 |

FOREIGN PATENTS

| | | |
|---|---|---|
| 127,717 | 6/1919 | Great Britain. |
| 130,471 | 8/1919 | Great Britain. |
| 803,115 | 6/1936 | France. |

ROBERT A. O'LEARY, *Primary Examiner.*

A. W. DAVIS, *Assistant Examiner.*